United States Patent
An

(10) Patent No.: US 8,508,595 B2
(45) Date of Patent: Aug. 13, 2013

(54) SURVEILLANCE CAMERA SYSTEM FOR CONTROLLING CAMERAS USING POSITION AND ORIENTATION OF THE CAMERAS AND POSITION INFORMATION OF A DETECTED OBJECT

(75) Inventor: Myung-seok An, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1229 days.

(21) Appl. No.: 12/080,582

(22) Filed: Apr. 4, 2008

(65) Prior Publication Data

US 2010/0321473 A1 Dec. 23, 2010

(30) Foreign Application Priority Data

Oct. 4, 2007 (KR) .................... 10-2007-0099884

(51) Int. Cl.
| | |
|---|---|
| *G06K 9/00* | (2006.01) |
| *H04N 5/225* | (2006.01) |
| *H04N 5/228* | (2006.01) |
| *H04N 5/232* | (2006.01) |
| *H04N 7/18* | (2006.01) |

(52) U.S. Cl.
USPC ...... 348/169; 348/143; 348/154; 348/208.14; 348/211.1; 348/211.6; 382/103; 382/106

(58) Field of Classification Search
USPC ............... 348/143, 154, 169, 208.14, 211.1, 348/211.6; 382/103, 106
See application file for complete search history.

(56) References Cited

U.S. PATENT DOCUMENTS

| | | | | |
|---|---|---|---|---|
| 4,321,625 A | * | 3/1982 | Smith | 348/211.11 |
| 4,386,848 A | * | 6/1983 | Clendenin et al. | 356/5.01 |
| 4,945,417 A | * | 7/1990 | Elberbaum | 348/211.6 |
| 4,992,866 A | * | 2/1991 | Morgan | 348/159 |
| 5,111,288 A | * | 5/1992 | Blackshear | 348/143 |
| 5,164,827 A | * | 11/1992 | Paff | 348/143 |
| 5,434,617 A | * | 7/1995 | Bianchi | 348/170 |
| 5,583,565 A | * | 12/1996 | Cortjens et al. | 348/14.1 |
| 5,699,444 A | * | 12/1997 | Palm | 382/106 |
| 5,825,432 A | * | 10/1998 | Yonezawa | 348/563 |

(Continued)

FOREIGN PATENT DOCUMENTS

| | | |
|---|---|---|
| CN | 1271233 A | 10/2000 |
| CN | 1937766 A | 3/2007 |

(Continued)

OTHER PUBLICATIONS

Office Action established for KR 10-2007-0099884 (Feb. 21, 2012).

*Primary Examiner* — Jerry Dennison
*Assistant Examiner* — Daniel C Murray
(74) *Attorney, Agent, or Firm* — Drinker Biddle & Reath LLP

(57) ABSTRACT

Provided is a surveillance camera system for controlling cameras by calculating a movement amount of the cameras based on position information and orientation information of the cameras and position information of an object being surveilled. The surveillance camera system includes: a camera receiving an image from a surveillance area; a driving device combined with the camera, wherein the driving device moves the camera; and a camera controller controlling the driving device by using initial coordinates defined with a position and an azimuth at which the camera is installed and a current direction of the camera, so that the camera faces a target position.

19 Claims, 5 Drawing Sheets

(56) References Cited

U.S. PATENT DOCUMENTS

| | | | |
|---|---|---|---|
| 6,002,995 A * | 12/1999 | Suzuki et al. | 702/188 |
| 6,079,862 A * | 6/2000 | Kawashima et al. | 382/103 |
| 6,166,763 A * | 12/2000 | Rhodes et al. | 348/143 |
| 6,215,519 B1 * | 4/2001 | Nayar et al. | 348/159 |
| 6,226,035 B1 * | 5/2001 | Korein et al. | 348/335 |
| 6,359,647 B1 * | 3/2002 | Sengupta et al. | 348/154 |
| 6,597,389 B2 * | 7/2003 | Tanaka et al. | 348/14.08 |
| 6,680,746 B2 * | 1/2004 | Kawai et al. | 348/211.9 |
| 6,690,374 B2 * | 2/2004 | Park et al. | 345/427 |
| 6,789,039 B1 * | 9/2004 | Krumm | 702/150 |
| 6,791,603 B2 * | 9/2004 | Lazo et al. | 348/169 |
| 6,809,760 B1 * | 10/2004 | Takagi et al. | 348/211.9 |
| 6,867,799 B2 * | 3/2005 | Broemmelsiek | 348/169 |
| 6,873,924 B1 * | 3/2005 | Welles et al. | 702/94 |
| 6,909,458 B1 * | 6/2005 | Suzuki et al. | 348/211.8 |
| 6,911,999 B2 * | 6/2005 | Sasaki | 348/211.6 |
| 6,954,224 B1 * | 10/2005 | Okada et al. | 348/159 |
| 6,973,200 B1 * | 12/2005 | Tanaka et al. | 382/103 |
| 6,998,987 B2 * | 2/2006 | Lin | 340/573.1 |
| 7,064,776 B2 * | 6/2006 | Sumi et al. | 348/169 |
| 7,151,558 B1 * | 12/2006 | Kogane et al. | 348/151 |
| 7,187,402 B2 * | 3/2007 | Yonezawa et al. | 348/159 |
| 7,212,228 B2 * | 5/2007 | Utsumi et al. | 348/139 |
| 7,242,423 B2 * | 7/2007 | Lin | 348/169 |
| 7,295,228 B2 * | 11/2007 | Roberts et al. | 348/143 |
| 7,301,557 B2 * | 11/2007 | Kakou et al. | 348/36 |
| 7,319,479 B1 * | 1/2008 | Crabtree et al. | 348/169 |
| 7,336,297 B2 * | 2/2008 | Ishigami et al. | 348/143 |
| 7,342,489 B1 * | 3/2008 | Milinusic et al. | 340/506 |
| 7,385,626 B2 * | 6/2008 | Aggarwal et al. | 348/143 |
| 7,394,916 B2 * | 7/2008 | Brodsky et al. | 382/103 |
| 7,515,176 B2 * | 4/2009 | Sasaki | 348/211.6 |
| 7,536,028 B2 * | 5/2009 | Sumitomo | 382/103 |
| 7,536,029 B2 * | 5/2009 | Choi et al. | 382/103 |
| 7,542,588 B2 * | 6/2009 | Ekin et al. | 382/103 |
| 7,551,222 B2 * | 6/2009 | Morofuji | 348/345 |
| 7,557,825 B2 * | 7/2009 | Ishii et al. | 348/159 |
| 7,583,815 B2 * | 9/2009 | Zhang et al. | 382/103 |
| 7,620,207 B2 * | 11/2009 | Brodsky et al. | 382/103 |
| 7,636,452 B2 * | 12/2009 | Kamon | 382/103 |
| 7,683,937 B1 * | 3/2010 | Blumenfeld | 348/211.11 |
| 7,720,257 B2 * | 5/2010 | Morellas et al. | 382/103 |
| 7,859,564 B2 * | 12/2010 | Kelly et al. | 348/143 |
| 7,880,766 B2 * | 2/2011 | Aoki et al. | 348/143 |
| 7,907,750 B2 * | 3/2011 | Ariyur et al. | 382/103 |
| 7,924,311 B2 * | 4/2011 | Yoshida et al. | 348/159 |
| 7,929,017 B2 * | 4/2011 | Aggarwal et al. | 348/169 |
| 7,956,889 B2 * | 6/2011 | Kelly et al. | 348/143 |
| 7,978,879 B2 * | 7/2011 | Muramatsu | 382/103 |
| 7,995,096 B1 * | 8/2011 | Cressy et al. | 348/153 |
| 8,013,729 B2 * | 9/2011 | Buehler | 340/506 |
| 8,022,893 B2 * | 9/2011 | Gatley et al. | 345/1.1 |
| 8,218,011 B2 * | 7/2012 | Cheng et al. | 348/159 |
| 8,270,767 B2 * | 9/2012 | Park | 382/284 |
| 8,284,254 B2 * | 10/2012 | Romanowich et al. | 348/154 |
| 8,289,390 B2 * | 10/2012 | Aggarwal et al. | 348/143 |
| 8,335,345 B2 * | 12/2012 | White et al. | 382/103 |
| 2002/0030741 A1 * | 3/2002 | Broemmelsiek | 348/169 |
| 2002/0067412 A1 * | 6/2002 | Kawai et al. | 348/211 |
| 2003/0040815 A1 * | 2/2003 | Pavlidis | 700/48 |
| 2003/0053658 A1 * | 3/2003 | Pavlidis | 382/103 |
| 2004/0105006 A1 * | 6/2004 | Lazo et al. | 348/169 |
| 2004/0164858 A1 * | 8/2004 | Lin | 340/522 |
| 2004/0263625 A1 * | 12/2004 | Ishigami et al. | 348/152 |
| 2005/0012817 A1 * | 1/2005 | Hampapur et al. | 348/143 |
| 2005/0219361 A1 * | 10/2005 | Aoki et al. | 348/159 |
| 2006/0203090 A1 * | 9/2006 | Wang et al. | 348/143 |
| 2006/0222209 A1 * | 10/2006 | Zhang et al. | 382/107 |
| 2006/0245500 A1 * | 11/2006 | Yonovitz | 375/240.19 |
| 2006/0279630 A1 * | 12/2006 | Aggarwal et al. | 348/143 |
| 2007/0039030 A1 * | 2/2007 | Romanowich et al. | 725/105 |
| 2007/0115358 A1 * | 5/2007 | McCormack | 348/159 |
| 2007/0146484 A1 * | 6/2007 | Horton et al. | 348/159 |
| 2007/0236561 A1 * | 10/2007 | Anai et al. | 348/46 |
| 2008/0129825 A1 * | 6/2008 | DeAngelis et al. | 348/169 |
| 2008/0225121 A1 * | 9/2008 | Yoshida et al. | 348/159 |
| 2008/0316324 A1 * | 12/2008 | Rofougaran et al. | 348/222.1 |
| 2009/0015677 A1 * | 1/2009 | Harrington | 348/172 |
| 2009/0115859 A1 * | 5/2009 | Lee | 348/208.4 |
| 2009/0160942 A1 * | 6/2009 | Kuo et al. | 348/169 |
| 2009/0231436 A1 * | 9/2009 | Faltesek et al. | 348/159 |
| 2009/0268033 A1 * | 10/2009 | Ukita | 348/169 |
| 2010/0245588 A1 * | 9/2010 | Waehner et al. | 348/169 |
| 2011/0043628 A1 * | 2/2011 | Yun, II | 348/143 |
| 2012/0081531 A1 * | 4/2012 | DeAngelis et al. | 348/77 |
| 2012/0147191 A1 * | 6/2012 | Snoussi | 348/159 |
| 2013/0010144 A1 * | 1/2013 | Park | 348/218.1 |

FOREIGN PATENT DOCUMENTS

| | | |
|---|---|---|
| KR | 10-2002-0078896 A | 10/2002 |
| KR | 10-2006-0083376 A | 7/2006 |
| KR | 10-2006-0083762 A | 7/2006 |
| KR | 10-2006-0112721 A | 11/2006 |
| KR | 10-2006-0121595 A | 11/2006 |
| KR | 10-2007-0041492 A | 4/2007 |
| KR | 1020070077274 A | 7/2007 |

* cited by examiner

SURVEILLANCE CAMERA SYSTEM FOR CONTROLLING CAMERAS USING POSITION AND ORIENTATION OF THE CAMERAS AND POSITION INFORMATION OF A DETECTED OBJECT

CROSS-REFERENCE TO RELATED PATENT APPLICATION

This application claims the benefit of Korean Patent Application No. 10-2007-0099884, filed on Oct. 4, 2007, in the Korean Intellectual Property Office, the disclosure of which is incorporated herein in its entirety by reference.

BACKGROUND OF THE INVENTION

1. Field of the Invention

The present invention relates to a surveillance camera system, and more particularly, to a surveillance camera system in which a plurality of cameras are installed in an area in order to surveil the area.

2. Description of the Related Art

A surveillance camera system surveils an area by recognizing an object by processing an image which is input through a camera that is installed at a predetermined position or that is installed in a mobile manner. The surveillance camera system may be used in a security system using images, such as an intelligent surveillance and monitoring robot, scientific systems for a general outpost (GOP), or a social safety robot system.

The surveillance camera system can detect and track an attacker through a long/short and day/night remote control by using a surveillance camera. The surveillance camera system having the aforementioned function may be used in a system for surveilling and tracking a dangerous area or used in a traffic administration system to monitor illegal parking and stops.

In the surveillance camera system, a plurality of cameras are operated by being linked with one another. That is, an object surveilled by a single camera may be also surveilled by other cameras installed near the object.

In addition, in order to surveil a wide area using the surveillance camera system, the surveillance camera system may have panning, tilting, and zooming functions.

SUMMARY OF THE INVENTION

In a surveillance camera system, when a first camera detects an object, a second camera, which is linked with the first camera, near the object can also surveil the object from another angle.

Location of the object received from the first camera is input into the second camera. It is possible for the second camera to surveil the object from another direction by controlling panning, tilting, and zooming of the second camera based on the information.

The present invention provides a surveillance camera system for controlling cameras by calculating movement amounts of the cameras by using position and orientation of the cameras and position information of a detected object.

In the surveillance camera system according to an embodiment of the present invention, it is possible to effectively and intensively surveil an object and/or surveil an object in a linked manner by linking a plurality of cameras with one another.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art.

Figure 1:
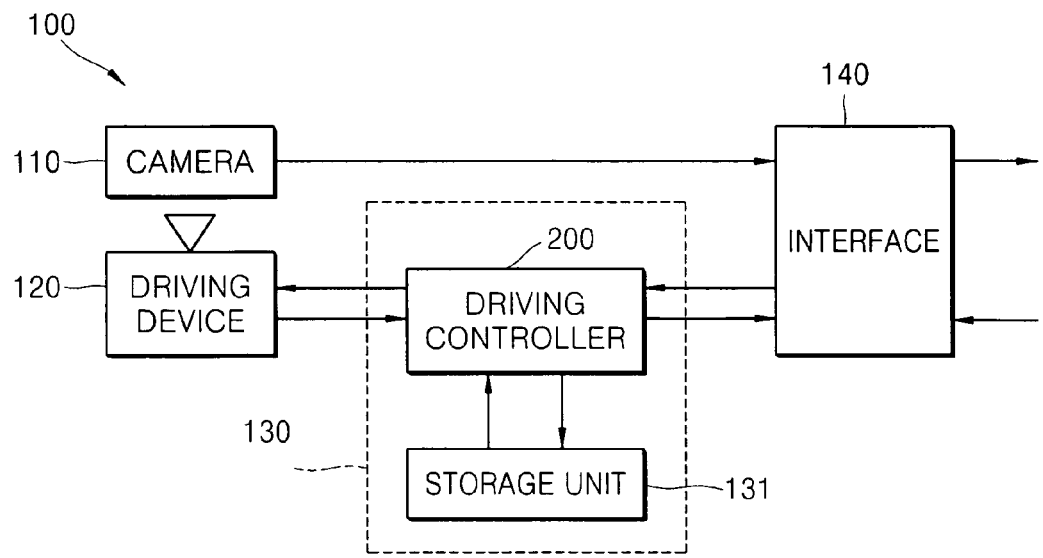
FIG. 1 is a block diagram schematically illustrating a surveillance camera system according to an exemplary embodiment of the present invention.
Figure 2:
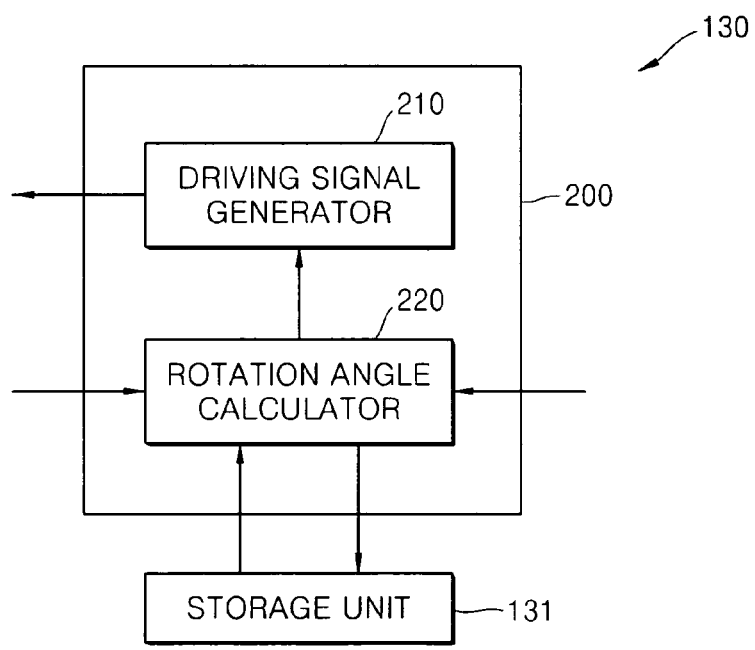
FIG. 2 is a block diagram schematically illustrating a camera controller of the surveillance camera system illustrated in FIG. 1.

FIG. 1 is a block diagram schematically illustrating a surveillance camera system 100 according to an exemplary embodiment of the present invention. FIG. 2 is a block diagram schematically illustrating a camera controller 130 of the surveillance camera system 100 illustrated in FIG. 1.

Referring to FIGS. 1 and 2, the surveillance camera system 100 may include a camera 110, a driving device 120, a camera controller 130, and an interface 140. The surveillance camera system 100 may include at least one surveillance unit. Each surveillance unit may include the camera 110, the driving device 120, the camera controller 130, and the interface 140.

The surveillance camera system 100 is installed in a predetermined area. The surveillance camera system 100 watches at least one part of the predetermined area as a surveillance area and surveils an object in the surveillance area.

The camera 110 can receive an image from the surveillance area. The driving device 120 is combined with the camera 110 to move the camera 110. The camera controller 130 receives the current direction that the camera 100 faces from the driving device 120 and externally receives a target direction for the camera 100 to face. Then, the camera controller 130 can control the driving device so that the camera 110 may face the target position.

The surveillance camera system 100 can externally receive initial coordinates and/or a target position through the interface 140.

The camera may include a zoom lens so as to zoom in or zoom out on an input image. In addition, the driving device 120 serves to pan and/or tilt the camera 110. That is, the camera 110 can receive various images by being moved, panned, and/or tilted by the driving device 120 or by zooming in or zooming out the zoom lens to control the zoom magnification power.

The camera controller 130 may include a driving controller 200 and a storage unit 131. The driving controller 200 can control the driving device 120. The initial coordinates defined with a position and an azimuth at which the camera 110 is installed may be stored in the storage unit 131.

The driving controller 200 enables the camera to be linked with another camera in the system. The driving controller 200 externally receives the target position of the camera 110 and controls the driving device 120, so that the camera 110 may face the target position.

Figure 3:
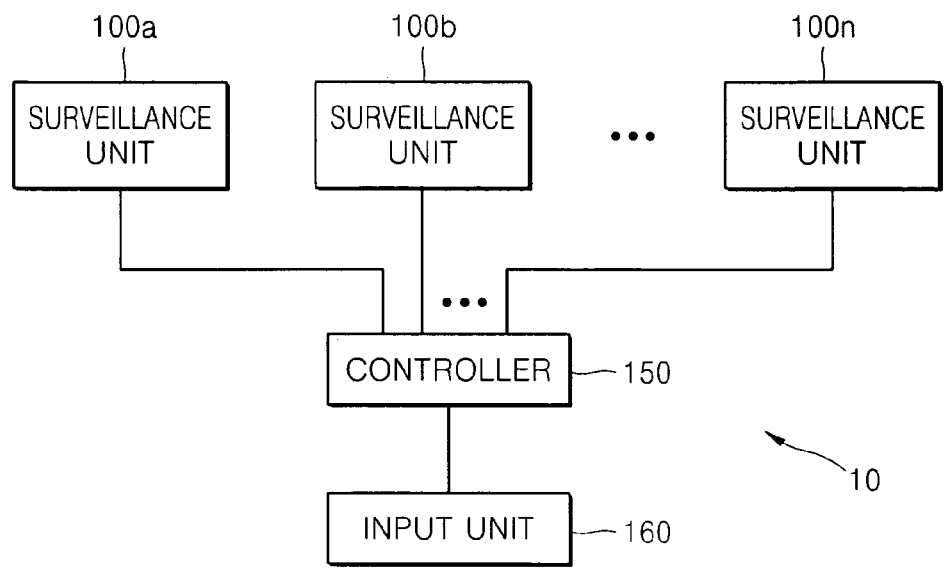
FIG. 3 is a block diagram schematically illustrating a surveillance camera system including a plurality of surveillance units according to an exemplary embodiment of the present invention.

As shown in FIG. 3, the surveillance camera system may include a plurality of surveillance units each including the camera, the driving device, and the camera controller. The driving controller 200 may receive the target position from another surveillance unit.

The driving controller 200 can calculate a rotation angle for panning and/or tilting the camera and can generate a driving signal for driving the driving device 120, so that the camera may be rotated according to the rotation angle. The driving controller 200 may include a rotation angle calculator 210 and a driving signal generator 220.

The rotation angle calculator 210 can calculate the rotation angle, according to which the camera is rotated, from the current direction and the initial coordinates of the camera, so that the camera may face the target position. The driving signal generator 220 can generate a driving signal for driving the driving device, so that the camera may be rotated according to the rotation angle.

When the camera is initially installed, the initial coordinates may indicate a position and an azimuth in an arbitrary reference coordinate system in which the camera is installed. In addition, the current direction indicates the direction currently faced by the camera. The current direction is calculated by reading the panning and/or tilting rotation amount of the camera, the result of which is received from the driving device.

The interface 140 may connect each surveillance unit to the outside of the surveillance camera system 100. At this time, the interface 140 may be a separate input unit. On the other hand, the surveillance camera system 100 is constructed with a plurality of surveillance units which are directly connected to one another or connected to one another through a separate controller. In this case, the interface 140 may be a unit for connecting the surveillance units to one another or connecting the surveillance units to the separate controller.

Figure 5:
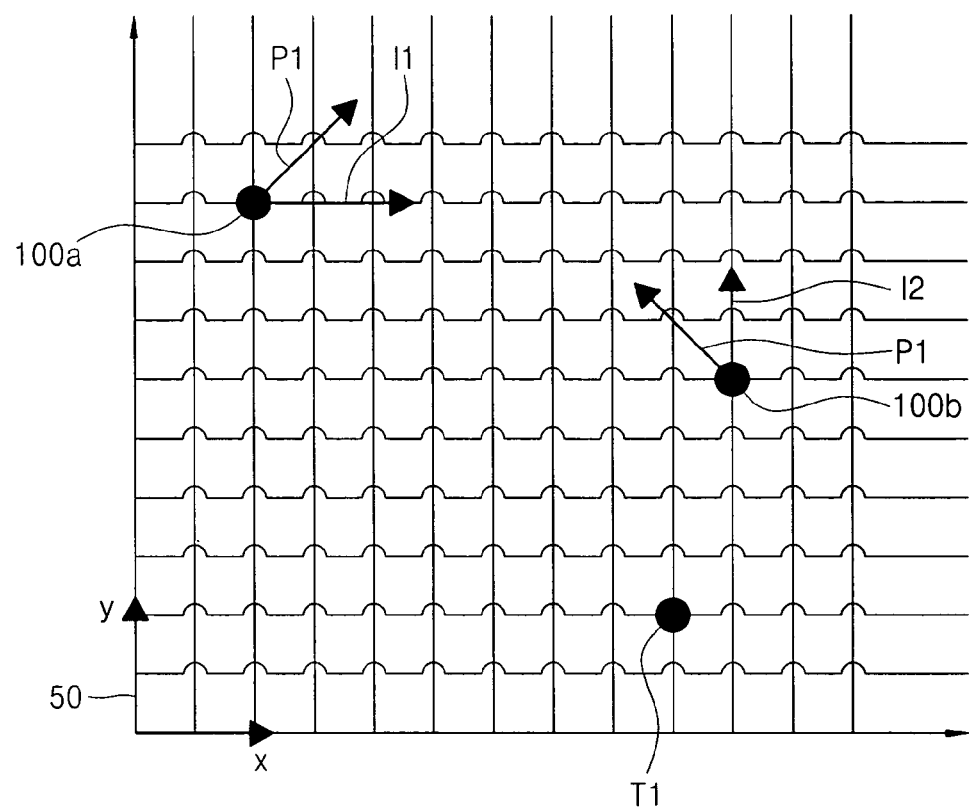
FIG. 5 schematically illustrates a position of an object to be surveilled with respect to surveillance units in the surveillance camera system illustrated in FIGS. 1 and 3.

As shown in FIG. 5, initial coordinates I1 and I2, target position T1, and current directions P1 and P2 may be defined. The initial coordinates I1 and I2 may be defined with positions and azimuths in which the cameras are installed. The current directions P1 and P2 indicate the directions that the cameras face. The target position indicates a position at which an object to be surveilled is located. The cameras are moved or rotated, so that the cameras may face the target position.

The initial coordinates, the target position, and the current directions may be defined in the same reference coordinate system. The reference coordinate system may be a coordinate system defined by a global positioning system (GPS) for the entire earth. In another embodiment, as shown in FIG. 5, the reference coordinate system (50 of FIG. 5) may be a map or a coordinate system that is set with respect to a position in a predetermined area.

The initial coordinates I1 and I2 are obtained by measuring the positions and the azimuths in the reference coordinate system, when the cameras are installed. The initial coordinates I1 and I2 are received through the interface 140 and stored in the storage unit 131.

Figure 4:
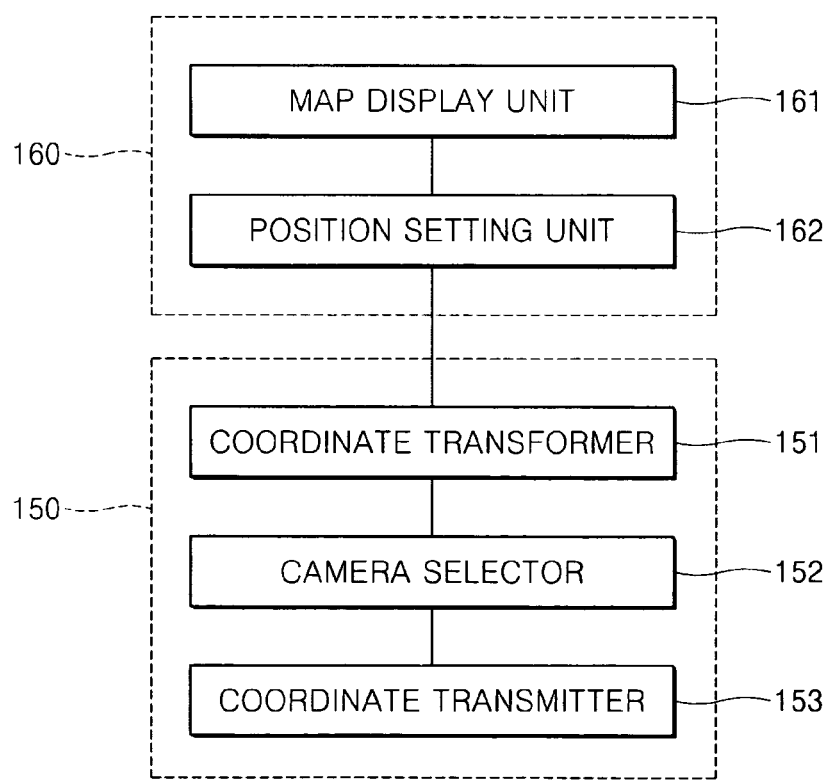
FIG. 4 is a block diagram schematically illustrating an input unit and a controller in the surveillance camera system illustrated in FIG. 3.

In the embodiment shown in FIGS. 3 and 4, the target position T1 may be input through the interface 140 as a coordinate value that is set on the map. In another embodiment shown in FIGS. 7 to 9, the target position T1 may be a coordinate value that is input through another camera.

The current directions P1 and P2 may be obtained by determining a difference between a status obtained by panning and/or tilting the camera and the initial status of the camera, by reading a panning and/or tilting amount of the driving device 120. Accordingly, a rotation angle θ of the camera, needed for allowing the camera to face the target position is calculated by using Equation 1.

That is the rotation angle θ calculated by using Equation 1 which uses an angle calculated by the rotation angle calculator 210 referred a displacement amount $\theta_1$ of the current direction with respect to the azimuth of the initial coordinates and a displacement amount of the target position (Tx, Ty) with respect to the initial coordinates (Ix, Iy).

$$\theta = \tan^{-1}\left(\frac{Ty - Iy}{Tx - Ix}\right) + \theta_1 \quad\quad \text{[Equation 1]}$$

In the surveillance camera system 100 according to the embodiment of the present invention, the direction that the camera 110 should face to surveil the object, which is located at the target position input through the interface, is calculated by using the position and the azimuth of the camera 110. In addition, the camera may be panned and/or tilted according to the rotation angle so as to face the target position in the current direction by driving the driving device 120.

Accordingly, in the surveillance camera system 100 according to an embodiment of the present invention, it is possible to easily and simply control the camera 110 so that the camera 110 may face the object surveilled with the initial coordinates of the camera 110 without preset.

On the other hand, it is possible to detect a moving object while surveilling each surveillance area in a preset method by dividing a predetermined area into a plurality of presets. At this time, in the preset method, each surveillance area is surveilled, while the camera is being panned or tilted based on the presets defined previously.

That is, in order to watch the surveillance areas, presets for cameras have to be previously set. When the cameras are initially installed, presets have to be set while users are controlling panning, tilting, and zooming values of all the cameras. This requires a lot of time and costs. Moreover the cameras can not observe areas in which the presets are not defined.

However, in the surveillance camera system 100 according to the embodiment of the present invention, it is possible to surveil an area intelligently and actively by processing an input of a user or an occurrence of an event without setting a preset.

FIG. 3 is a block diagram schematically illustrating a surveillance camera system 10 including a plurality of surveillance units 100a to 100n. FIG. 4 is a block diagram schematically illustrating a controller 150 and an input unit 160 in the surveillance camera system 10.

Referring to FIGS. 3 and 4, in the surveillance camera system 10, a target position of an object to be surveilled is input using a map, and the object to be surveilled is intensively surveilled by the plurality of surveillance units 100a to 100n. Accordingly, the surveillance camera system 10 may include the plurality of surveillance units 100a to 100n, the controller 150, and the input unit 160. At this time, the surveillance units 100a to 100n may construct the surveillance camera system 100 shown in FIGS. 1 and 2.

Each of the surveillance units 100a to 100n may include the camera 100, the driving device 120, and the camera controller 200 which are shown in FIGS. 1 and 2. Each of the surveillance units will be described with reference to FIGS. 1 and 2.

The input unit 160 receives a position of the object to be surveilled on the map. The controller 150 selects at least one designated surveillance unit to surveil the object from among the surveillance units 100a to 100n and transmits the target coordinates of the object to be surveilled to the selected designated surveillance units.

The position of the object to be surveilled may be received through the input unit 160. The input unit 160 may include a map display unit 161 and a position setting unit 162.

The map in which positions of the cameras are marked may be displayed on the map display unit 161. The position setting unit 162 may receive the position of the object to be surveilled which is designated on the map.

The map display unit 161 may be a general display device connected to a user input device. The input device may be a touch screen attached to a panel of a display device.

That is, in the map display unit 161, the map may be displayed on the display device, and the user selects one position on the map through the input device. The selected position may be the target position of the object to be surveilled. In addition, in the map display unit 161, positions of the cameras may be displayed on the map.

The position setting unit 162 may receive the target position that is the selected position as a position of the object to be surveilled.

The input unit 160 may be another surveillance unit or a separate controller. That is, the target coordinates of the object to be surveilled may be input through the surveillance unit or separate controller.

The controller 150 may include a coordinate transformer 151, a camera selector 152, and a coordinate transmitter 153.

The coordinate transformer 151 transforms the position of the object to be surveilled into the target position in the reference coordinate system. The camera selector 152 selects designated surveillance units. The coordinate transmitter 153 transmits the target position of the object to be surveilled to the designated surveillance units.

The coordinate transformer 151 transforms the position of the object to be surveilled into the target position in the reference coordinate system and selects the designated surveillance units from among the surveillance units based on the initial coordinates of the surveillance units.

Figure 6:
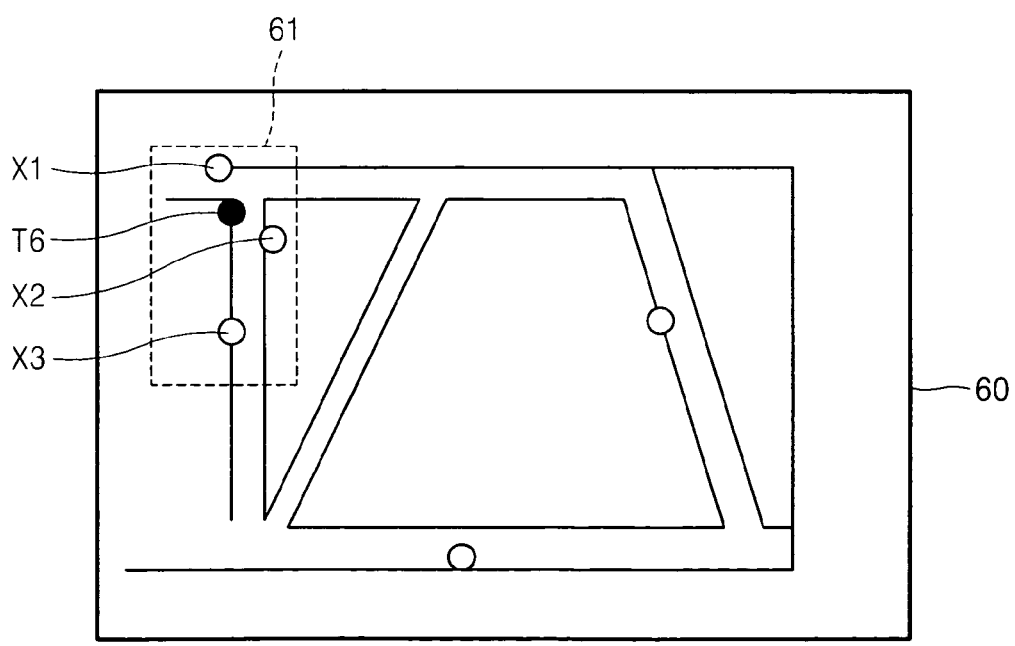
FIG. 6 schematically illustrates an intensive surveillance technique by using the surveillance camera system illustrated in FIG. 3 according to an embodiment of the present invention.

The camera selector 152 can select surveillance units located within a predetermined range from the target position as the designated surveillance units. As shown in FIG. 6, the user sets a predetermined area on the map as a set area by using the map display unit 161. The camera selector 152 can select all the surveillance units installed within the set area as the designated surveillance units.

A map 60 of a predetermined area is displayed on the map display unit 161. An object T6 to be surveilled and a set area 61 may be set by the user. At this time, for easy searching of the designated surveillance units, the set area 61 may be set so as to include the object T6 to be surveilled.

In the embodiment shown in FIG. 6, three surveillance units X1 to X3 are included in the set area 61. The surveillance units X1 to X3 included in the set area 61 may be the designated surveillance units.

On the other hand, the reference coordinate system may be a three-dimensional (3D) coordinate system including altitude information. At this time, the camera selector 152 can select the surveillance units capable of watching the object to be surveilled as the designated surveillance units by using information on the 3D map.

That is, the camera selector 152 can select designated surveillance units capable of watching the object by utilizing information on sizes and altitudes of a building or obstacles located in a predetermined area on the map, information on a position at which the camera is installed, and information on surrounding environments through the information on the 3D map.

It is possible to transmit the target position of the object to be surveilled to the selected designated surveillance units by using the coordinate transmitter 153.

On the other hand, the controller 150 may directly control the surveillance units. Initial coordinates are stored in the surveillance units. The controller 150 receives the initial coordinates of the surveillance units by communication with the surveillance units and selects the designated surveillance units capable of surveilling the object located at the target coordinates. The controller 150 transmits the target coordinates to only the selected designated surveillance units and allows the designated surveillance units to intensively watch the object.

At this time, the controller 150 requests the surveillance units to provide the initial coordinates thereof. The controller 150 receives the initial coordinates from the surveillance units and selects the designated surveillance units. In another embodiment, the controller 150 may further include a storage unit for storing initial coordinates of all the connected surveillance units.

The controller 150 and the input unit 160 may be a computer such as a PC including a display device.

On the other hand, FIG. 5 illustrates a position T1 of the object to be surveilled with respect to the surveillance units 100a and 100b.

The initial coordinates I1 and I2 including positions and azimuths of the surveillance units 100a and 100b may be defined in the reference coordinate system 50. In addition, the current directions P1 and P2 of the surveillance units 100a and 100b may be defined in the reference coordinate system. In addition, the target position T1 of the object to be surveilled may be defined in the reference coordinate system.

Accordingly, in order to allow the surveillance units 100a and 100b to face the object to be surveilled, rotation angles of the surveillance units may be calculated by using Equation 1.

In the current embodiment, the plurality of surveillance units 100a to 100n are connected to one another through the controller 150. Alternatively, the surveillance units 100a to 100n may be connected to one another through a network without the controller 150. At this time, a surveillance unit designates a predetermined object to be surveilled. The surveillance unit selects designated surveillance units capable of watching the object to be surveilled from among the surveillance units. The target coordinates are transmitted to the designated surveillance units. Accordingly, the designated surveillance units can intensively watch the object to be surveilled.

Figure 7:
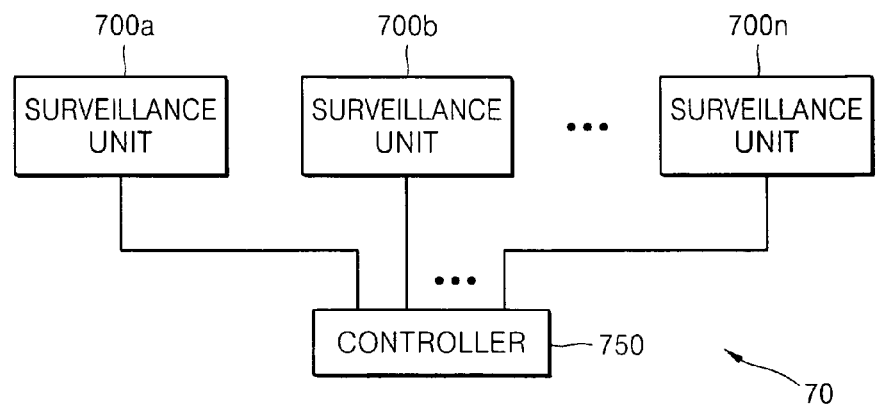
FIG. 7 is a block diagram schematically illustrating a surveillance camera system including a plurality of surveillance units according to another exemplary embodiment of the present invention.
Figure 8:
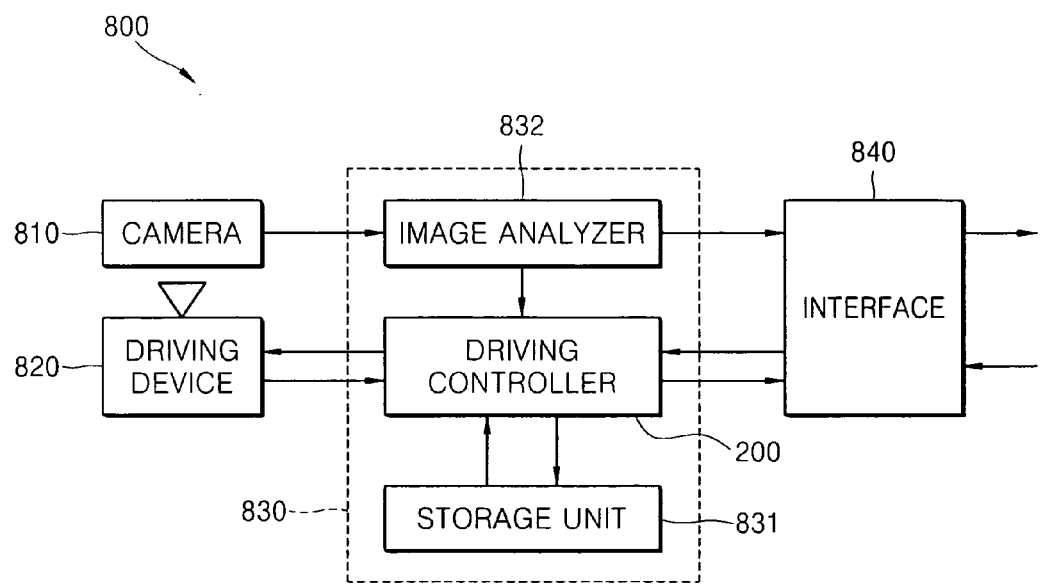
FIG. 8 is a block diagram schematically illustrating a surveillance unit in the surveillance camera system illustrated in FIG. 7 according to an embodiment of the present invention.
Figure 9:
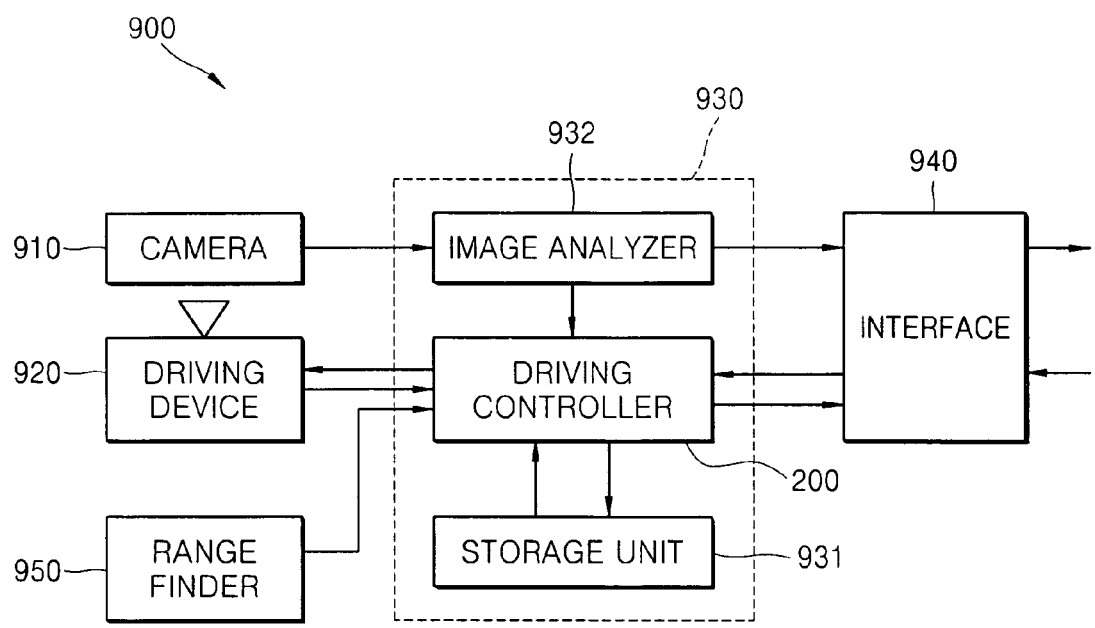
FIG. 9 is a block diagram schematically illustrating a surveillance unit in the surveillance camera system illustrated in FIG. 7 according to another embodiment of the present invention.

FIG. 7 illustrates a surveillance camera system 70 including a plurality of surveillance units 700a to 700n. FIG. 8 illustrates a surveillance unit 800 in the surveillance camera system 70 according to an embodiment of the present invention. FIG. 9 illustrates a surveillance unit 900 in the surveillance camera system 70 according to another embodiment of the present invention.

Referring to FIGS. 7 to 9, in the surveillance camera system 70, one surveillance unit detects a moving object. Surveillance units, which are linked with the surveillance unit and are capable of surveilling the moving object that is the object to be surveilled, are selected. It is possible to surveil and/or track the object being surveilled by using a plurality of surveillance units which are linked with one another. The surveillance camera system 70 may include the first and second surveillance units 700a and 700b and a controller 750. At this time, surveillance units 700a to 700n may construct the surveillance camera system 100 shown in FIGS. 1 and 2.

The first surveillance unit 700a detects the moving object in a surveillance area, recognizes the position of the moving object, and generates the target position. The second surveillance unit 700b receives the target position and tracks the moving object while being linked with the first surveillance unit 700a. At this time, the second surveillance unit 700b can track the moving object as it moves.

The controller 750 receives the target position from the first surveillance unit 700a, selects one or more second surveillance units 700b from among the surveillance units 700a to 700n, and transmits the target coordinates of the moving object to the second surveillance units 700b.

Alternatively, in another embodiment, the surveillance units may be directly connected to one another without passing through the controller 750. That is, the first surveillance unit 700a generates the target position and selects the second surveillance units 700b from among the surveillance units 700a to 700n. In addition, the first surveillance unit 700a can directly transmit the target coordinates of the moving object to the second surveillance units 700b.

On the other hand, in order to track the moving object by using two or more cameras linked with each other, a camera has to recognize an approximate distance between the moving object and the other camera that tracks the moving object. A range finder (950 of FIG. 9), which is capable of calculating a distance between the camera and the moving object, may be used. Alternatively, an image analyzer (832 of FIG. 8), which analyzes an image by using an algorithm, can estimate the distance.

Surveillance units 800 and 900 may further include image analyzers 832 and 932 which are capable of sensing the moving object or measuring the distance between the surveillance units and the moving object by analyzing the image received from the camera. At this time, as shown in FIGS. 8 and 9, the image analyzers 832 and 932 may be included in camera controllers 830 and 930, respectively. Surveillance units 800 and 900 may further include camera 810, 910, driving device 820, 920, storage unit 831, 931, and interface 840, 940.

The image analyzers 832 and 932 can detect the moving object by analyzing the image received from the camera. In addition, it is possible to estimate the distance between the camera and the moving object by using an algorithm relating to camera geometry.

In another embodiment, as shown in FIG. 9, the surveillance unit 900 may further include a range finder 950 for measuring the distance between the camera and the moving object. Various range finders such as a laser range finder (LRF) may be used as the range finder 950.

The surveillance camera system according to an embodiment of the present invention may be applied to a surveillance camera system using cameras with panning, tilting, and zooming functions. When a predetermined position is designated by monitoring software or when a single camera recognizes an event at a predetermined position, the designated or recognized position is transmitted to the cameras adjacent to the position. Accordingly, it is possible, by using the monitoring software, to construct a system capable of viewing an image at the position by rotating the cameras installed near the moving object based on the transmitted position.

When a single camera tracks an object and when the object completely deviates from the visible range of the camera, it is also possible to construct a system in which another camera capable of viewing the moving object may be allowed to subsequently track the object.

When a monitoring user recognizes a position at which an event occurs from an input of the position at which the event occurs, it is possible to calculate the position at which the event occurs with respect to another camera. Accordingly, it is possible to obtain an image by controlling a zoom magnification power.

It is impossible to use a camera equipped with a GPS and a direction sensor indoors. However, in the case of a camera according to an embodiment of the present invention, it is possible to set the position of the camera by using absolute or relative coordinates in the building. In this case, the camera may be used outdoors.

Accordingly, it is possible to intelligently surveil and/or track an area to be surveilled by using a plurality of cameras linked with one another by actively processing an input of a user or an occurrence of an event without setting presets.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A surveillance camera system comprising:
a first surveillance unit located at a first position, the first surveillance unit comprising:
a first camera to obtain a first image of a surveillance area;
a first driving device combined with the first camera, the first driving device to move the first camera; and
a first camera controller to control the first driving device using coordinates of a target position based on initial coordinates defined by a position and an azimuth at which the first camera is installed, and a current direction of the first camera, so that the first camera faces the target position; and
an image analyzer to process the first image to identify a moving object in the surveillance area;
wherein:
the first camera controller is configured to determine target object coordinates in a reference coordinate system corresponding to the identified moving object; and the first surveillance unit sends the target object coordinates directly to a second surveillance unit in reference coordinate system coordinates;

the system further comprising:

the second surveillance unit that is located at a second position, the second surveillance unit comprising:

a second camera to obtain a second image of the surveillance area;

a second driving device combined with the second camera, the second driving device to move the second camera;

a second camera controller to calculate the coordinates of the target position in camera pan and tilt coordinates based on:

initial coordinates defined by a position and an azimuth at which the second camera is installed;

a current direction of the second camera; and the target object coordinates in the reference coordinate system coordinates received from the first surveillance unit;

wherein:

each of the first camera controller and the second camera controller comprises:

a coordinate transformer configured to transform the position of an object to be surveilled into the target position in the reference coordinate system;

a camera selector configured to select designated surveillance units for surveilling the object to be surveilled from among a further surveillance unit and the first and second surveillance units; and a coordinate transmitter configured to transmit the target position of the object to be surveilled to the selected designated surveillance units in reference coordinate system coordinates; and the reference coordinate system is defined by a global positioning system (GPS).

2. The surveillance camera system of claim 1, wherein the first camera controller and the second camera controller comprises:

a driving controller to control the driving device; and a storage unit to store the initial coordinates.

3. The surveillance camera system of claim 2, wherein the driving controller is configured to receive the current direction from the driving device.

4. The surveillance camera system of claim 2, wherein a driving controller is configured to receive the target position in reference coordinate system coordinates and to control the driving device by moving the camera in a pan and tilt reference system of the camera, so that the camera faces the target position.

5. The surveillance camera system of claim 1, wherein the initial coordinates and the target position are defined in a reference coordinate system.

6. The surveillance camera system of claim 5, wherein the driving controller comprises:

a rotation angle calculator to calculate a rotation angle, according to which the camera is rotated, from the current direction and the initial coordinates, so that the camera faces the target position; and a driving signal generator to generate a driving signal for driving the driving device, so that the camera is rotated according to the rotation angle.

7. The surveillance camera system of claim 6, wherein the rotation angle calculator is configured to calculate the rotation angle by using a displacement amount of the current direction with respect to the azimuth of the initial coordinates and a displacement amount of the target position with respect to the initial coordinates.

8. The surveillance camera system of claim 5, further comprising an interface configured to receive at least one of the initial coordinates and the target position in reference coordinate system coordinates.

9. The surveillance camera system of claim 1, wherein the camera comprises a zoom lens for zooming in or out the image.

10. The surveillance camera system of claim 1, wherein the driving device is capable of at least one of panning and tilting the camera.

11. The surveillance camera system of claim 1, further comprising:

a plurality of surveillance units each including the camera, the driving device, and the camera controller;

an input unit configured to receive a position of an object in reference coordinate system coordinates to be surveilled on a map; and a controller configured to select at least one designated surveillance unit for surveilling the object to be surveilled from among the plurality of surveillance units and the first and second surveillance units and configured to transmit the target coordinates of the object to be surveilled to the selected designated surveillance units in reference coordinate system coordinates.

12. The surveillance camera system of claim 11, wherein the input unit comprises:

a map display unit configured to display a map on which positions of the cameras are displayed; and a position setting unit configured to receive the position of the object to be surveilled in reference coordinate system coordinates which is designated on the map.

13. The surveillance camera system of claim 11, wherein the controller is configured to select the designated surveillance units with reference to the initial coordinates that are defined by the position and the azimuth at which the camera is installed and that are transmitted from the surveillance units.

14. The surveillance camera system of claim 1, wherein the camera selector is configured to select surveillance units installed within a predetermined range from the target position as the designated surveillance units.

15. The surveillance camera system of claim 1, wherein the camera selector is configured to select all the surveillance units installed within a set area that is set on the map as the designated surveillance units.

16. The surveillance camera system of claim 1, wherein the reference coordinate system is a three-dimensional (3D) coordinate system including altitude information, and wherein the camera selector is configured to select surveillance units, which are capable of surveilling the object to be surveilled by using information on a 3D map, as the designated surveillance units.

17. The surveillance camera system of claim 1, wherein the second surveillance unit tracks the moving object, as the moving object moves.

18. The surveillance camera system of claim 1, wherein the first surveillance unit includes an image analyzer configured to sense the moving object and determine a distance from the moving object by analyzing an image received from the camera.

19. The surveillance camera system of claim 1, wherein each of the first and second surveillance units include a range finder that measures a distance from the moving object.

* * * * *